United States Patent [19]

Halpern

[11] 4,336,184

[45] Jun. 22, 1982

[54] INTUMESCENT FLAME RETARDANT THERMOPLASTIC POLYPHENYLENE ETHER COMPOSITIONS

[75] Inventor: Yuval Halpern, Skokie, Ill.

[73] Assignee: Borg-Warner Chemicals, Inc., Parkersburg, W. Va.

[21] Appl. No.: 292,117

[22] Filed: Aug. 12, 1981

[51] Int. Cl.³ ............................ C08K 3/32; C08V 9/00
[52] U.S. Cl. ............................ 523/179; 260/DIG. 24; 521/85; 521/90; 521/129; 521/139; 521/907; 524/100; 524/120; 524/508
[58] Field of Search ............... 260/45.8 NT, DIG. 24; 521/85, 90, 129, 139, 907

[56] References Cited

U.S. PATENT DOCUMENTS 3,383,435 5/1968 Cizek .................................. 525/132
4,201,705 5/1980 Halpern ...................... 260/45.8 NT Primary Examiner—Morton Foelak
Attorney, Agent, or Firm—Richard J. Schlott

[57] ABSTRACT

Thermoplastic polyphenylene ether compositions comprising a polyphenylene ether-styrenic resin blend, a pentate salt of an amino-s-triazine and optionally a polyol are flame retardant and intumescent and may be compounded to be self-extinguishing.

5 Claims, No Drawings

INTUMESCENT FLAME RETARDANT THERMOPLASTIC POLYPHENYLENE ETHER COMPOSITIONS

BACKGROUND OF THE INVENTION

This invention relates to flame retardant polyphenylene ether compositions. More particularly, this invention relates to flame retardant thermoplastic polyphenylene ether compositions comprising a thermoplastic polyphenylene ether and a flame retarding amount of the pentate salt of an amino-s-triazine and to a method for rendering thermoplastic polyphenylene ethers flame retardant.

Polyphenylene ethers such as poly-(2,6-dimethyl-1,4-phenylene) ether are well-known thermoplastic resins having excellent high temperature mechanical properties. These resins, in the native, unplasticized form, are difficult to mold or otherwise melt process, and require the addition of compatable resins such as polystyrene and impact-modified polystyrene to improve the processability and molding properties of the resin for most applications. The preparation and properties of a variety of such blends is disclosed and discussed in U.S. Pat. Nos. 3,883,435 and 4,038,343. Although the addition of styrenic resins to polyphenylene ether resins markedly improves processability, the burning characteristics of such blends are also substantially increased. Thus, though polyphenylene ether resins are generally regarded as non-burning, unfilled blends containing polystyrene or high impact polystyrene have a UL 94 rating of V-1.

The addition of flame retardant additives to blend-modified polyphenylene ether resins will result in blends having a UL 94 rating of V-0, and a variety of halogen-based and phosphorus-based flame retardant additives are known for this purpose. For some applications, however, the use of phosphorus- or halogen-based flame retardant additives may be detrimental to key physical properties and limit the wider use of these blends. An alternative flame retardant would thus broaden the choices available to the resin compounder for meeting the demands of the market.

SUMMARY OF THE INVENTION

The pentate salts of amino-s-triazines are effective intumescent flame retardant additives for thermoplastic polyphenylene ether-styrenic resin blends, providing compositions that are self-extinguishing and intumescent. The additives are dry, white, powdery solids and are readily compounded with polyphenylene ethers to provide compositions which have excellent color and which are readily processed without apparent foaming or decomposition during molding.

DETAILED DESCRIPTION OF THE INVENTION

The flame retardant polyphenylene ether compositions of this invention comprise a thermoplastic polyphenylene ether-styrenic resin blend and a flame retarding amount of a pentate salt of an amino-s-triazine.

The polyphenylene ether-styrenic resin blends useful for the purposes of this invention are blends comprising a polyphenylene ether and a styrenic resin such as polystyrene, impact-modified polystyrene or styrene-containing copolymers such as for example styrene-acrylonitrile resins, ABS resins, styrenebutadiene block and random copolymers and the like. The preparation of representative compositions is disclosed in U.S. Pat. No. 3,383,435 and a variety of suitable polyphenylene ether-styrenic resin blends is presently available in the market place.

The pentate salts of amino-s-triazines useful for the purposes of this invention are pentaerythritol diphosphate salts (pentates) having the following structure:

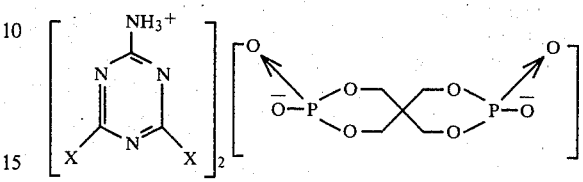

wherein x may be —NH$_2$ or —OH, and include melammonium pentate, (x=—NH$_2$), the pentate salt of ammelide (x=OH), and mixtures thereof.

The pentate salts of amino-s-triazines are readily prepared by first hydrolyzing a pentate compounds such as dichloropentate to provide the free acid, then reacting that product with the requisite amount of the amino-s-triazine to form the sparingly soluble salt. For example, the dichloropentate is first hydrolyzed by warming with aqueous alkali. This product is then added to a warm aqueous solution of the amino-s-triazine containing sufficient mineral acid to dissolve the triazine. The sparingly soluble pentate salt precipitates from the solution as a fine powder or crystalline compound. As an alternative, an acid acceptor such as a tertiary amine may be employed in place of the alkali to promote the hydrolysis reaction. As a third alternative, the amino-s-triazine may be added to the aqueous mixture prior to hydrolysis, whereupon the pentate salt is formed and precipitates as the hydrolysis proceeds. The preparation of pentate salts of amino-s-triazines is more fully described in U.S. Pat. No. 4,154,930.

The amount of flame retardant pentate salt employed will be from about 20 to about 50 wt. percent, preferably of the total composition. The pentate salts may be employed alone or, more preferably together with a polyol such as for example pentaerythritol, dipentaerythritol or tri-pentaerythritol to aid in forming char.

The compositions of this invention are flame retardant and intumescent, forming upon combustion a tough, non-burning foamed char surface layer which insulates and protects the substrate from further burning. The char layer additionally appears to prevent dripping of molten resin during combustion.

The compounding of the polyphenylene ether-styrenic resin bend with the flame retardant pentate salt may be carried out in any of the conventional compounding processes including Banbury mixing, powder mixing, melt extrusion of the polyphenylene ether and the flame retardant components, milling the components together on a roll mill and the like. The composition may further include such additives as plasticizers, heat and light stabilizers, antioxidants, pigments, dyes and the like as is commonly practiced in the compounding art.

The following examples are provided to illustrate the practice of this invention.

EXAMPLES 1–6

In the following Examples, summarized in Table I, compositions containing polyphenylene ether-styrenic resin blends and varying levels of melammonium pentate and dipentaerythritol were prepared and tested.

The flame testing was carried out by Underwriters Laboratory Test method UL 94, vertical Burn Method. The Limiting Oxygen Index test method or LOI, described in ASTM 2863-74, is a further method for rating flammability. The flammability decreases with increase in LOI value.

The compounding was carried out by first dry-mixing the additive components with the polyphenylene ether then melt-mixing the composition using a Brabender mixing head fitted with rollerblades for 5 min. at 80 rpm. The blend was then compression-molded to form a slab, which was cut into test bars. The test data for the various compositions are summarized in Table I.

TABLE I

| Ex. No. | 1 | 2 | 3 | 4 | 5 |
| --- | --- | --- | --- | --- | --- |
| Component[1] | | | | | |
| Polypheneylene ether blend I[2] | 100 | — | 100 | 100 | — |
| Polypheneylene ether blend II[2] | — | 100 | — | — | 100 |
| Melammonium pentate | — | — | 40 | 35 | 35 |
| Dipentaerythritol | — | — | 4 | 3.5 | 3.5 |
| FR Additive, WT. % | — | — | 27.7 | 25.4 | 25.4 |
| UL Rating | NVE | NVE | V-0 | NVE | V-O |
| LOI | 20.0 | 22.3 | 25.3 | 22.9 | 25.5 |

Notes:
[1]Components of formulation in parts by weight
[2]Polyphenylene Ether Blend I = blend of polyphenylene ether and polystyrene obtained as Noryl PN 235 from General Electric Co. Polyphenylene Blend II = blend of polyphenylene ether and Polystyrene obtained as Noryl PX844 from General Electric Co.

It will be apparent that polyphenylene etherstyrenic resin blends may be made intumescent and flame retardant by the addition of as little as 25 wt.% melammonium pentate (compare Example 2 with Example 5).

The level of melammonium pentate required to provide a self-extinguishing composition will depend in part upon the relative proportions of polyphenylene ether and styrenic resin. Thus, the composition of Blend II is made flame retardant, intumescent and self-extinguishing by the incorporation of as little as 25 wt.% melammonium pentate. The composition of Blend I, however, which contains a higher proportion of styrenic resin, is made self-extinguishing and intumescent by the addition of 28 wt.% melammonium pentate (Example 3) but has an NVE rating when only 25 wt.% melammonium pentate is employed (Example 4). At levels of melammonium pentate lower than that required to impart self-extinguishing properties, the compositions are still flame retarded as LOI values (Compare Example 1 with Example 4).

The invention will thus be seen to be compositions comprising a thermoplastic polyphenylene ether-styrenic resin blend and a flame-retarding amount of the pentate salt of an amino-s-triazine, said salt being selected from the group melammonium pentate, the pentate salt of ammelide and mixtures thereof, wherein the amount of said salt will be from about 20 to about 50 percent by weight of the total composition, and a method for rendering thermoplastic polyphenylene ether-styrenic resin blends intumescent and self-extinguishing.

Further modifications including the use of dyes, pigments, fillers, stabilizers and the like will be apparent to those skilled in the art, and such additives and modifications may be made without departing from the spirit and scope of the invention, which is defined solely by the following claims.

I claim:

1. Thermoplastic polyphenylene ether compositions comprising (a) thermoplastic polyphenylene ether-styrenic resin blend, (b) a flame retarding amount of an intumescent additive selected from the group consisting of melammonium pentate, the pentate salt of ammelide, and mixtures thereof, and (c) a polyol.

2. The composition of claim 1 wherein the intumescent additive is present in from about 20 to about 50 percent by weight of the total composition.

3. The composition of claim 1 wherein said additive is melammonium pentate.

4. The composition of claim 1 wherein said additive is melammonium pentate and the polyol is dipentaerythritol.

5. A method for rendering thermoplastic polyphenylene ether-styrenic blends intumescent and self-extinguishing consisting of compounding therewith from about 20 to about 50 percent by weight based on final composition of an additive selected from the group consisting of melammonium pentate, the pentate salt of ammelide and mixtures thereof, and a polyol selected from the group consisting of pentaerythritol, dipentaerythritol and tripentaerythritol.

* * * * *